US005283568A

United States Patent [19]

Asai et al.

[11] Patent Number: 5,283,568

[45] Date of Patent: Feb. 1, 1994

[54] RADIO PAGER WITH HIGH SPEED CLOCK OF CONTROLLED RISE TIME

[75] Inventors: Takayuki Asai, Tokyo; Akira Muramatsu, Shizuoka, both of Japan

[73] Assignee: NEC Corporation, Tokyo, Japan

[21] Appl. No.: 805,627

[22] Filed: Dec. 12, 1991

[30] Foreign Application Priority Data

Dec. 12, 1990 [JP] Japan ................................ 2-409861

[51] Int. Cl.[5] .......................... H04Q 7/02; H04B 1/16

[52] U.S. Cl. .............................. 340/825.44; 455/38.3; 455/343

[58] Field of Search ........... 340/311.1, 825.44, 825.47, 340/825.48; 455/13.4, 32.1, 38.2, 38.3, 127, 343

[56] References Cited

U.S. PATENT DOCUMENTS 4,437,095 3/1984 Akahori et al. ................ 340/825.44

*Primary Examiner*—Donald J. Yusko
*Assistant Examiner*—John E. Giust
*Attorney, Agent, or Firm*—Sughrue, Mion, Zinn, Macpeak & Seas

[57] ABSTRACT

A radio pager having means for automatically adjusting the rising time of a high-speed clock. The pager includes a plurality of circuit elements for adjusting the rising time of the high-speed clock, i.e., for compensating the degree of stability of a high-speed clock generating circuit. On the start of a low-speed clock, the high-speed clock generating circuit sequentially selects and connects the circuit elements to thereby count the resulting rising times of the high-speed clock. One of the circuit elements having resulted the shortest rising time is written to a storage. When the high-speed clock is needed, e.g., when a message should be displayed, the stored circuit element is connected to the high-speed clock generating circuit.

15 Claims, 9 Drawing Sheets

RADIO PAGER WITH HIGH SPEED CLOCK OF CONTROLLED RISE TIME

BACKGROUND OF THE INVENTION

1. Field of the Invention

The present invention relates to a radio pager and, more particularly, to a radio pager having a high-speed clock whose frequency does not interfere with a received radio frequency (RF) signal and allowing the high-frequency clock to rise in a short period of time.

2. Description of the Prior Art

Generally, a central station included in a radio paging system modulates an RF signal by a digital paging signal and sends the modulated RF signal over one of a plurality of frequency channels (e.g. 150 megahertz band; channel interval of 25 kilohertz). A radio pager has an RF section for receiving the RF signal coming in through an antenna. The RF section demodulates the RF signal to reproduce the digital paging signal while a decoder decodes the digital paging signal to output a call signal including an address signal. In response to the call signal, a reception control having a CPU as a major component thereof performs selective reception control. Specifically, the reception control determines whether or not the received address is coincident with an address assigned to the pager and stored in a ROM and, if the former is coincident with the latter, produces a tone through a speaker and/or displays a message on a display, thereby alerting the user of the pager to the call.

It is a common practice to provide the above-described radio pager with various battery saving (BS) configurations. Specifically, in a standby (SB) mode wherein a power switch is turned off or a BS mode wherein the RF signal is received intermittently, the RF section, decoder and CPU execute digital signal processing which consumes little power in response to a low-speed clock (typically 32.768 kilohertz) fed from a low-speed clock generating circuit (or data clock generating circuit) which is included in the decoder. On the other hand, a high-speed operation is needed when a message signal should be written to a RAM (message process (MP) mode) or when a message should be displayed on the display (message display (MD) mode). In such a mode operation, the reception control and display execute digital signal processing in response to a high-speed clock (typically 2 megahertz) fed from a high-speed clock generating circuit (or operation clock generating circuit) which is included in the reception control. The high-speed clock not only aggravates the power consumption of the reception control and display but also constitutes a source of noise.

More specifically, the frequency of the high-speed clock has to be adjusted to an adequate frequency which prevents the higher harmonics of the clock from interfering with the RF signal received by the RF section or the demodulated paging signal or from disturbing the signal processing. To meet this requirement, the high-speed clock frequency is adjusted on the production line or, at the latest, after the pager has been used for the first time and before the high-speed clock is generated. However, it is likely that the circuit constant selected by the frequency adjustment is inadequate and causes the frequency-to-loop phase characteristic of the circuit to sharply change, increases the rising time of the high-speed clock, and/or practically stops the generation of the high-speed clock. In light of this, the high-speed clock generating circuit is provided with a compensation circuit for compensating the degree of circuit stability and connects a particular circuit element which minimizes the rising time of the high-speed clock to the compensation circuit. The required characteristic value of such a circuit element generally depends on the frequency of the high-speed clock. It has been customary, therefore, to select one of a plurality of frequency adjusting elements and one of the circuit elements each having an adequate characteristic and connect them to the high-speed clock generating circuit at the production stage, thereby adjusting the frequency and rising time of the high-speed clock. Selecting one adjusting element out of each of two groups of adjusting elements in matching relation to the frequency channel at the production stage is not desirable. Moreover, when the frequency channel is changed after the adjustment, the frequency and rising time of the high-speed clock have to be adjusted again by a time- and labor-consuming procedure.

OBJECTS OF THE INVENTION

It is, therefore, an object of the present invention to provide a radio pager having a high-speed clock generating circuit capable of automatically adjusting, even after the clock frequency has been adjusted, the rising time of the clock to the shortest time under given conditions.

It is another object of the present invention to provide a radio pager having a high-speed clock generating circuit which allows the frequency and rising time of a high-speed clock to be readily adjusted when the frequency channel used is changed.

SUMMARY OF THE INVENTION

In a radio pager of the present invention, digital circuits included in an RF section which demodulates an RF signal coming in through an antenna to a digital paging signal, decoding section for decoding the paging signal to a call signal, reception control for performing selective reception control in response to the call signal, and display for displaying a message in response to a command from the reception control execute digital signal processing by using one or both of a low-speed clock fed from a low-speed clock generating circuit included in the decoding section and a high-speed clock fed from a high-speed clock generating circuit included in the reception control.

The high-speed clock generating circuit which is the major feature of the present invention has a high-speed clock generator including frequency adjusting means and generating the high-speed clock, and rising time adjusting means which minimizes the rising time of the high-speed clock under given conditions, i.e., means for maintaining the high-speed clock generator in a high performance and stable condition. After the adjustment of the high-speed clock frequency, the adjusting means causes selecting means to sequentially connect a plurality of circuit elements to the high-speed clock generator. Every time one circuit element is connected to the high-speed clock generator, time counting means counts the rising time of the high-speed clock. Comparing means compares the resulting plurality of rising times to thereby select a particular circuit element matching the shortest rising time. The number assigned to the selected circuit element is written to a storage together with the shortest rising time. When the high-speed clock is needed such as for displaying a message, the identification number is read out of the storage by a high-speed clock request signal sent from the reception control, and a circuit element matching the identification number is connected to the high-speed clock generator. Such adjustment begins automatically immediately after a battery has beer mounted on the pager and ends automatically before the high-speed clock is needed. More specifically, the adjustment can be effected on a pager production line or between the time when the pager is used for the first time and the time when the pager enters into a high-speed clock supply mode.

BRIEF DESCRIPTION OF THE DRAWINGS

The above-mentioned and other objects, features and advantages of the present invention will become more apparent from the following detailed description taken in conjunction with the accompanying drawings, wherein.

DETAILED DESCRIPTION OF THE PREFERRED EMBODIMENT

Figure 1:
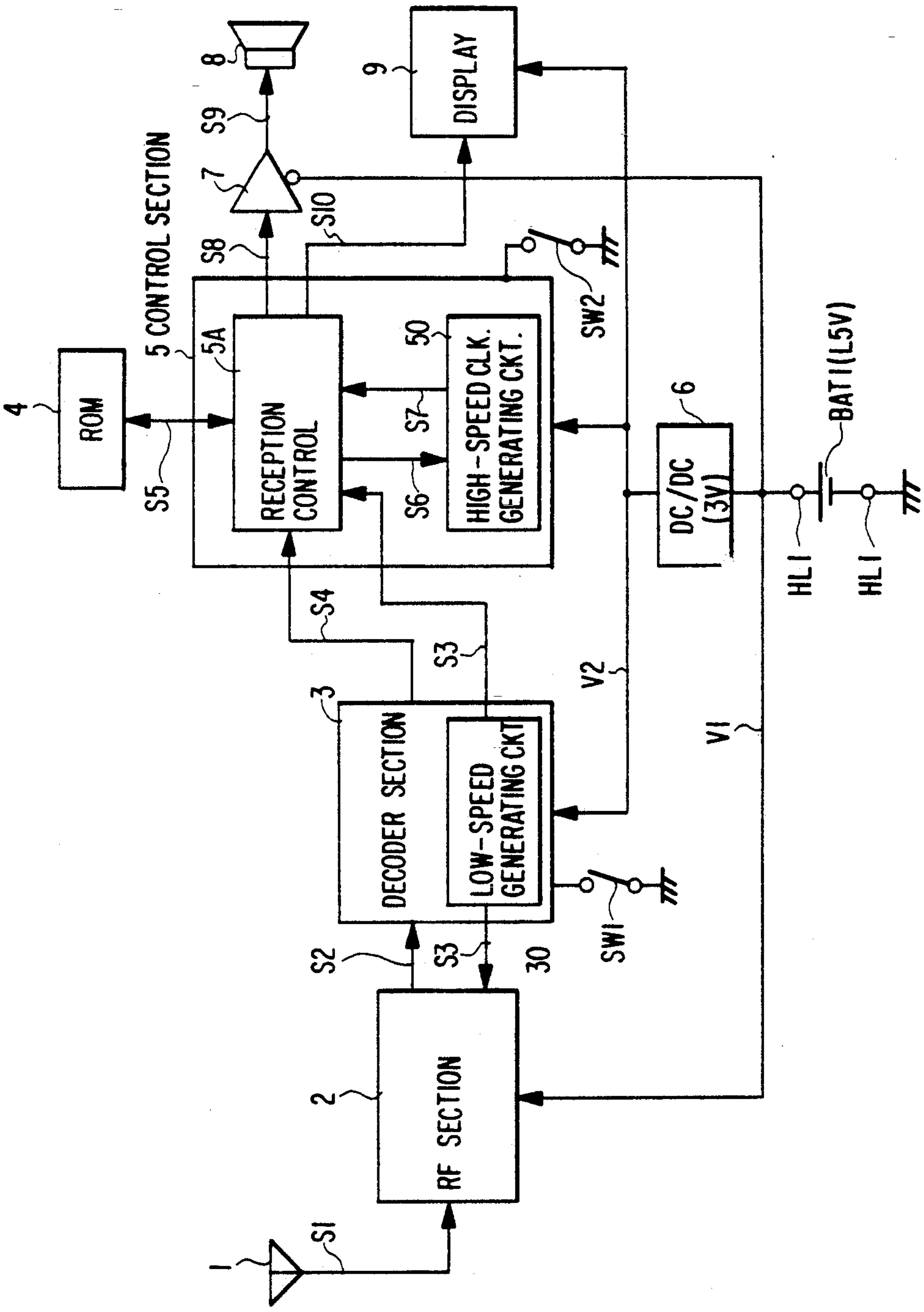
FIG. 1 is a block diagram schematically showing a radio pager embodying the present invention.

Referring to FIG. 1 of the drawings, a radio pager embodying the present invention is shown and includes an antenna 1. A radio frequency (RF) signal S1 is sent from a central station included in a radio paging system and comes in the radio pager through the antenna 1. An RF section 2 demodulates the RF signal S1 to produce a digital paging signal S2. A decoder section 3 decodes the digital paging signal to output a call signal S4 including an address signal and a message signal. A control section 5 includes a reception control 5A for comparing the address signal S4 with an address S5 stored in a ROM 4. If the address signal S4 is coincident with the address S5, the reception control 5A executes control for alerting the user of the pager to the reception of a call (hereinafter referred to as selective reception control). An amplifier 7 amplifies a first tone signal S8 fed thereto from the reception control 5A, thereby producing a second tone signal S9. A loudspeaker 8 sounds in response to the tone signal S9. A display 9 displays a message in response to a display command signal S10 fed from the reception control 5A. A battery BAT1 is accommodated in a battery holder HL1 for supplying a primary voltage V1 (e.g. 1.5 volts) to the RF section 2, a DC/DC converter 6, and the amplifier 7. The DC/DC converter 6 outputs a secondary voltage V2 (e.g. 3.0 volts) by converting the primary voltage V1 and delivers the voltage V2 to the decoder 3, control section 5, and display 9.

A low-speed clock generating circuit 30 begins to generate a low-speed clock (typically 32.768 kilohertz) as soon as the battery BAT1 is mounted on the battery holder HL1. The circuit 30 feeds the low-speed clock to the inside of the decoder section 3 and, at the same time, to the RF section 2 and control section 5 by a control signal S3. In response, the decoder section 3, RF section 2 and control section 5 execute digital signal processing which consumes little power, i.e., the pager performs a BS mode operation.

Assume that after the user has turned on a power switch SW1 connecting to the decoder 3, the reception control 5A determines that the received address signal S4 is coincident with the address stored in the ROM 4. Then, the reception control 5A determines that high-speed digital signal processing, i.e., an MP mode is required. Only in the MP mode and when a display switch SW2 is turned on to set up an MD mode, a high-speed clock generating section 50 feeds a high-speed clock (typically 2 megahertz) to the reception control 5 and display 9 as signals S7 and S10 in response to a high-speed clock request signal S6 from the reception control 5A. In response to the high-speed clock, the reception control 5A and display 9 execute signal processing which consumes great power and constitutes a source of high frequency noise. Nevertheless, in the MP mode and MD mode, priority is given to rapid digital signal processing.

The high-speed clock generating section 50 has a high-speed clock generator for generating a high-speed clock S7, conventional frequency adjusting means for finely adjusting the frequency of the clock S7 in order to prevent the higher harmonics of the clock S7 from interfering with the RF signal S1 received by the RF section 2, and rising time adjusting means for minimizing the rising time of the clock S7 under given conditions. To constitute the rising time adjusting means, a circuit element which minimizes the rising time of the clock S7 at the adjusted frequency is selected out of a plurality of circuit elements and connected to a compensation circuit associated with the high-speed clock generator. The adjustment of the rising time begins as soon as the battery BAT1 is mounted on the pager, i.e., just after the start-up of the low-speed clock generating circuit 30 and ends before the high-speed clock S7 is requested. Such adjustment may be practiced on a pager production line or, if not practicable on the production line, between the time when the pager is used for the first time and the time when a high-speed clock S7 feed mode begins.

As stated above, the radio pager of the present invention includes rising time adjusting means for minimizing the rising time of the high-speed clock S7 fed from the high-speed clock generating circuit 50. This is successful in rendering the high-speed clock S7 stable by a simple operation.

Figure 2:
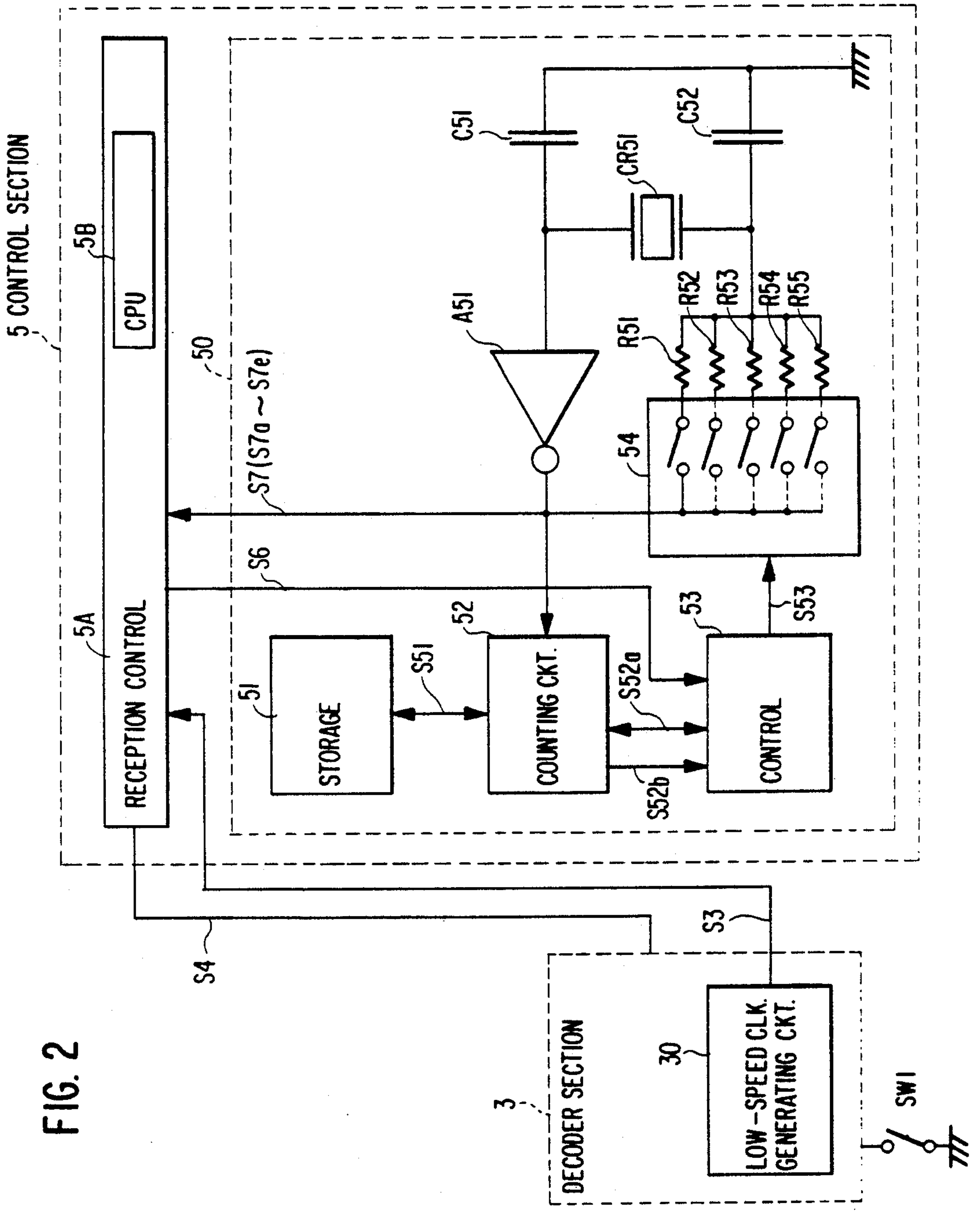
FIG. 2 is a block diagram schematically showing a specific construction of a high-speed clock generating circuit included in the embodiment.

FIG. 2 shows a specific construction of the high-speed clock generating circuit 50. As shown, the circuit 50 has a feedback type high-speed clock generator implemented as a ring-like connection of a crystal oscillator CR51, an inverter A51, and one of resistors R51–R55 which is selected by a selector 54. Among the resistors R51–R55, the resistor R51 has the smallest resistance; the resistance sequentially increases with the resistor number. Capacitors C51 and C52 are connected to the crystal oscillator CR51 for finely adjusting the oscillation frequency (frequency of high-speed clock S7) which is substantially determined by the resonance frequency of the oscillator CR 51. The capacitors C51 and C52 are adjusted by conventional frequency adjusting means to such a frequency that the higher harmonics of the clock S7 do not interfere with the RF signal S1. However, should the adjusted capacitance of the capacitors C51 and C52 be brought out of the recommended constant of the high-speed clock generator, the stability of the clock generator would be degraded. The resistors R51–R55 each having a particular resistance serve to compensate for the decrease in the stability of the high-speed clock generator. Specifically, so long as the resistance of the resistor (one of R51–R55) is adequate, the rising time of the high-speed clock is short. However, if the resistance is excessively high, the rising time increases due to a short amount of feedback; if it is excessively low, the rising time of the regular oscillation mode increases since the crystal oscillator CR51 oscillates in a spurious mode at first. In light of this, the high-speed clock generating circuit 50 automatically connects the resistors R51–R55 to the high-speed clock generator one by one to thereby count the resulting rising times, and then selects one of the resistors R51–R55 resulted the shortest rising time as a resistor to be connected in the event of high-speed clock supply. With such a construction, the circuit 50 sets up the optimal stability under given conditions.

Figure 3:
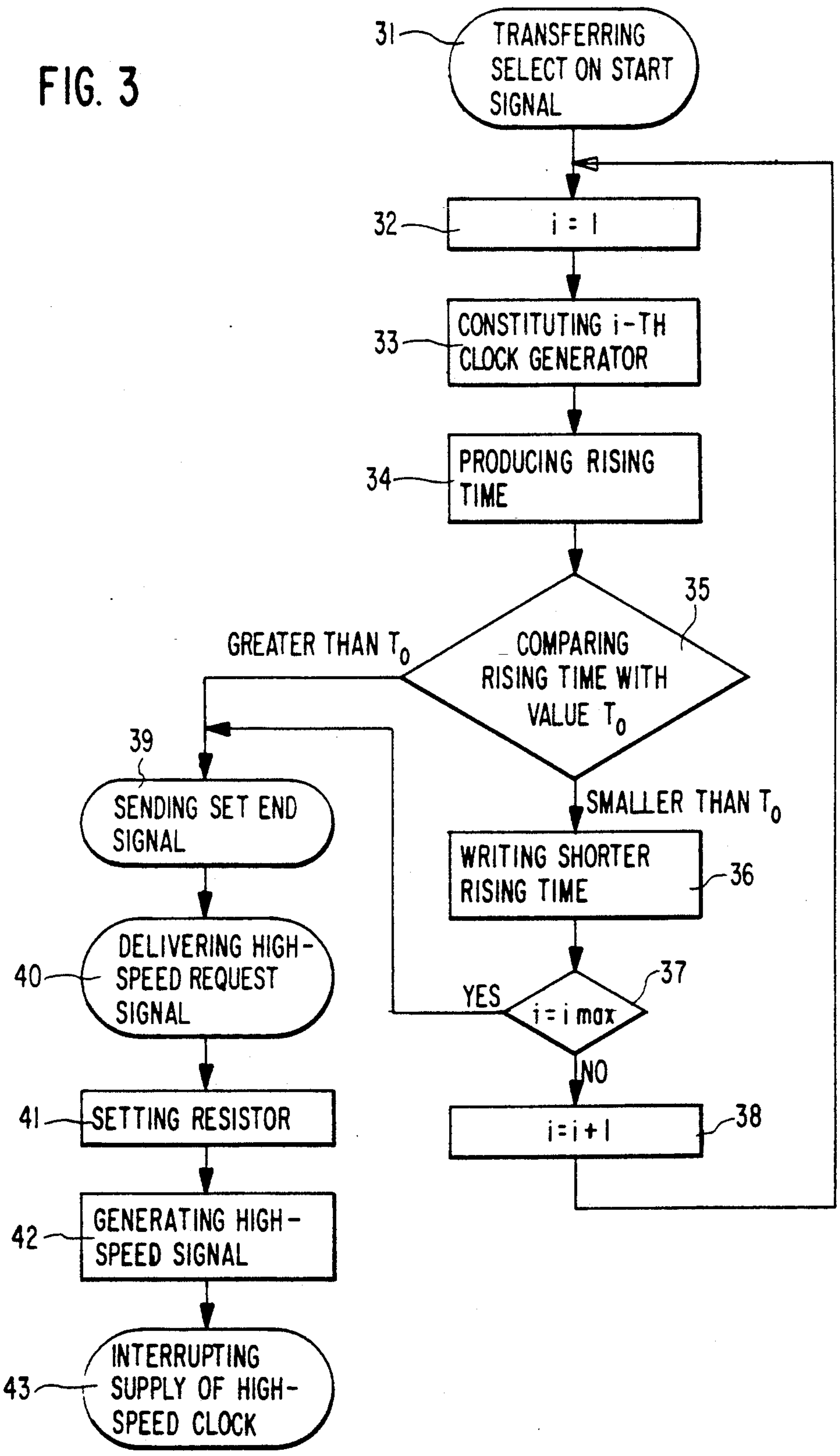
FIG. 3 is a flowchart demonstrating a specific operation of the high-speed clock generating circuit.
Figure 4:
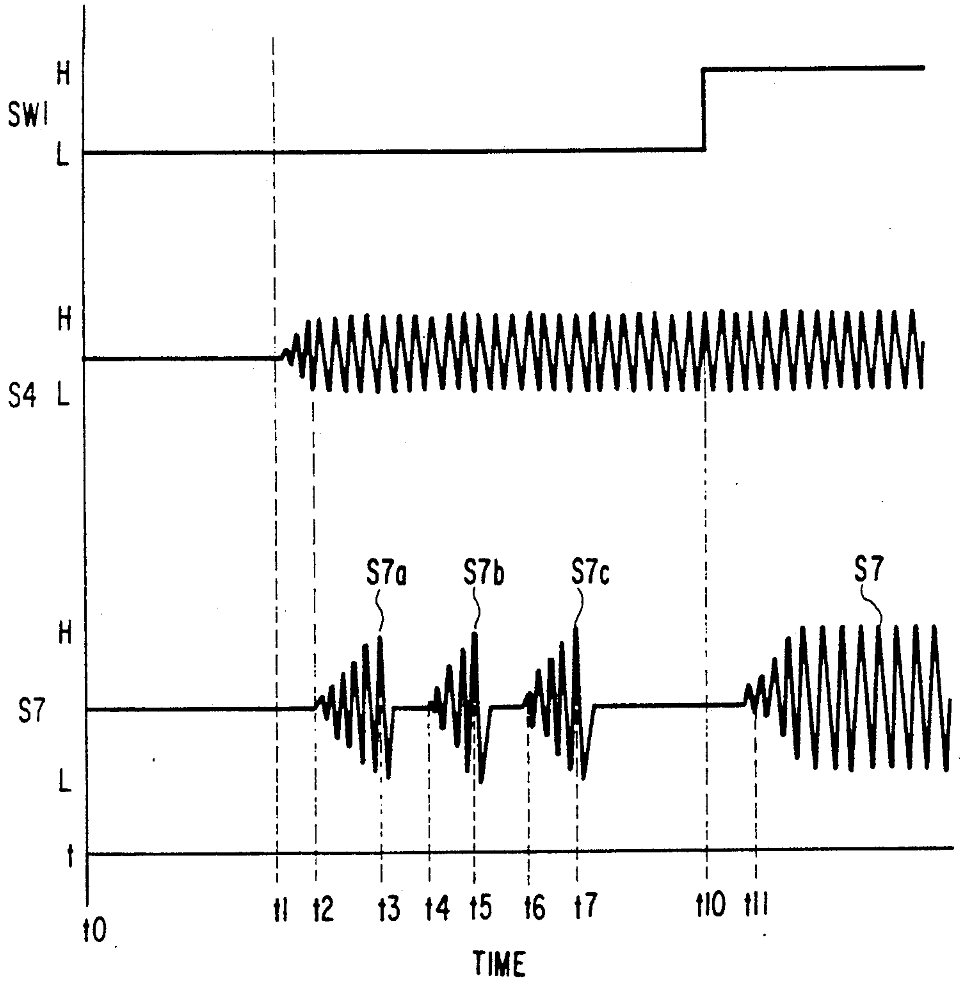
FIG. 4 shows signal waveforms useful for understanding the operation of the high-speed clock generating circuit.

Referring to FIGS. 3 and 4 as well as to FIG. 2, the battery BAT1 is mounted at a time t1. Then, the low-speed clock generating circuit 30 starts generating the low-speed clock S4 (e.g. on the elapse of 3 to 10 milliseconds) and feeds it to the reception control 5A which is included in the control section 5 and has a CPU 5B as a major component thereof. The reception control 5A transfers the low-speed clock S4 to a control 53 included in the high-speed clock generating circuit 50 as a selection start signal S6 (step 31). At a time t2, the control 53 feeds a selection control signal S53 to a selecting section 54 for causing it to connect the first resistor R51 to the high-speed clock generator. At the same time, the control 53 starts up rising time counting means included in a counting circuit 52 by a control signal S52*a*. As a result, the high-speed clock generator constitutes a first high-speed clock generator and generates a first high-speed clock S7*a* (steps 32 and 33). In response to the control signal S52, the counting circuit 52 starts counting the rising time of the high-speed clock S7*a* at the time t2 and stops counting it at a time t3, thereby producing a rising time T1 (step 34). The counting circuit 52 reads a maximum value T0 (assumed to be the rising time of the zeroth high-speed clock generator) out of an EEPROM (Electrically Erasable Programmable ROM) or similar storage 51 by a read signal S51 and then compares the above-mentioned rising time T1 with a value T0 (step 35). The counting circuit 52 writes the shorter rising time T (here, the rising time T1 of the first high-speed clock generator) in the storage 51 after Cr without substituting it for the other (step 36). Thereupon, the counting circuit 52 sends a count end signal S52*b* (e.g. low-speed clock S4) to the control 53 while resetting the rising time counting means. In response to the signal S52*b*, the control 53 again sends the selection control signal S53 (clock S4) to the selecting circuit 54 and, at the same time, starts up the time counting means by the control signal S52*a* (steps 38 and 32). In response, the selecting circuit 54 connects the second resistor R52 to the high-speed clock generator (step 33). Assume that the rising time T of the high-speed clock S7 decreases with the increase in the number assigned to the resistors. Then, the counting circuit 52 sequentially connects the other resistors up to the fifth resistor R55 in response to the count end signals S52*b* to thereby count the resulting rising times (T2=t5−t4, T3=t7−t6). Finally, the counting circuit 52 writes the shortest rising time T5 in the storage 51.

Assume that the i-th (i being an integer ranging from 1 to 5) rising time Ti counted by the counting circuit 52 is longer than the rising time Tx stored in the storage 51, as determined in the step S35. Then, the counting circuit 52 determines that a high-speed clock generator having the rising time Tx has been located and sends a set end signal S52*b* (e.g. high level signal) to the control 53 (step 39). At this instant, the number assigned to the resistor (one of R51–R55) having resulted the rising time Tx and the rising time Tx are stored in the storage 51.

When the rising time T5 counted last is shortest and the control 53 has counted the last number imax in the step 37, the control 53 also determines that the setting of the resistor has ended. Then, the operation is transferred to a step 39. At this instant, the number assigned to the resistor R55 which constitutes the fifth high-speed clock generator and the rising time T5 are stored in the storage 51.

The high-speed clock S7 is fed by the following procedure. The power switch SW1 is turned on at a time t10 to turn on the power source of the paper. Since the turn-on of the power source has to be displayed on the display 9, a power-on signal is sent from the decoder 3 to the reception control 5A as a control signal S4. In response, the reception control 5A delivers a high-speed request signal S6 to the control 53 (step 40). On receiving the signal S6, the control 53 feeds a control signal S52*a* to the counting circuit 52 to command it to read the resistor number out of the storage 51. As the counting circuit 52 delivers the resistor number (S52*b*) to the control 53, the control 53 applies a resistor set signal S53 to the selecting circuit 54. Then, the selecting circuit 54 connects one of the resistors R51–R55 associated with the resistor number to the high-speed clock generator. As a result, the high-speed clock generator starts generating the high-speed clock S7 at a time t11 (step 42). Thereafter, the control 53 receives a high-speed clock stop signal S6 from the reception control 5A. In response, the control 53 commands the selecting circuit 54 to disconnect the resistor from the high-speed clock generator by a control signal S53 (e.g. low level signal), thereby interrupting the supply of high-speed clock (S7) (step 43).

The means for storing the resistor number having been set (step 39) may be incorporated in the control 53. Then, in the step 41 (resistor setting step), the control 53 can send the resistor set signal S53 for selecting the stored resistor (one of R51–R55) to the selector 53 immediately in response to the high-speed clock request signal S6.

While the control 53 and the CPU 5A are shown in FIG. 2 as comprising independent circuits, they may, of course, be constituted by single hardware and have the individual functions implemented by software means. In such a case, the low-speed clock S3 will be directly fed to the control 53. The storage 51, counting circuit 52, control 53 and selecting circuit 54 are clocked by the low-speed clock S3. The cock request signal S6 is selectively fed based on the decision of the reception control 5A even at times other than the time when the power source is turned on.

Figure 5:
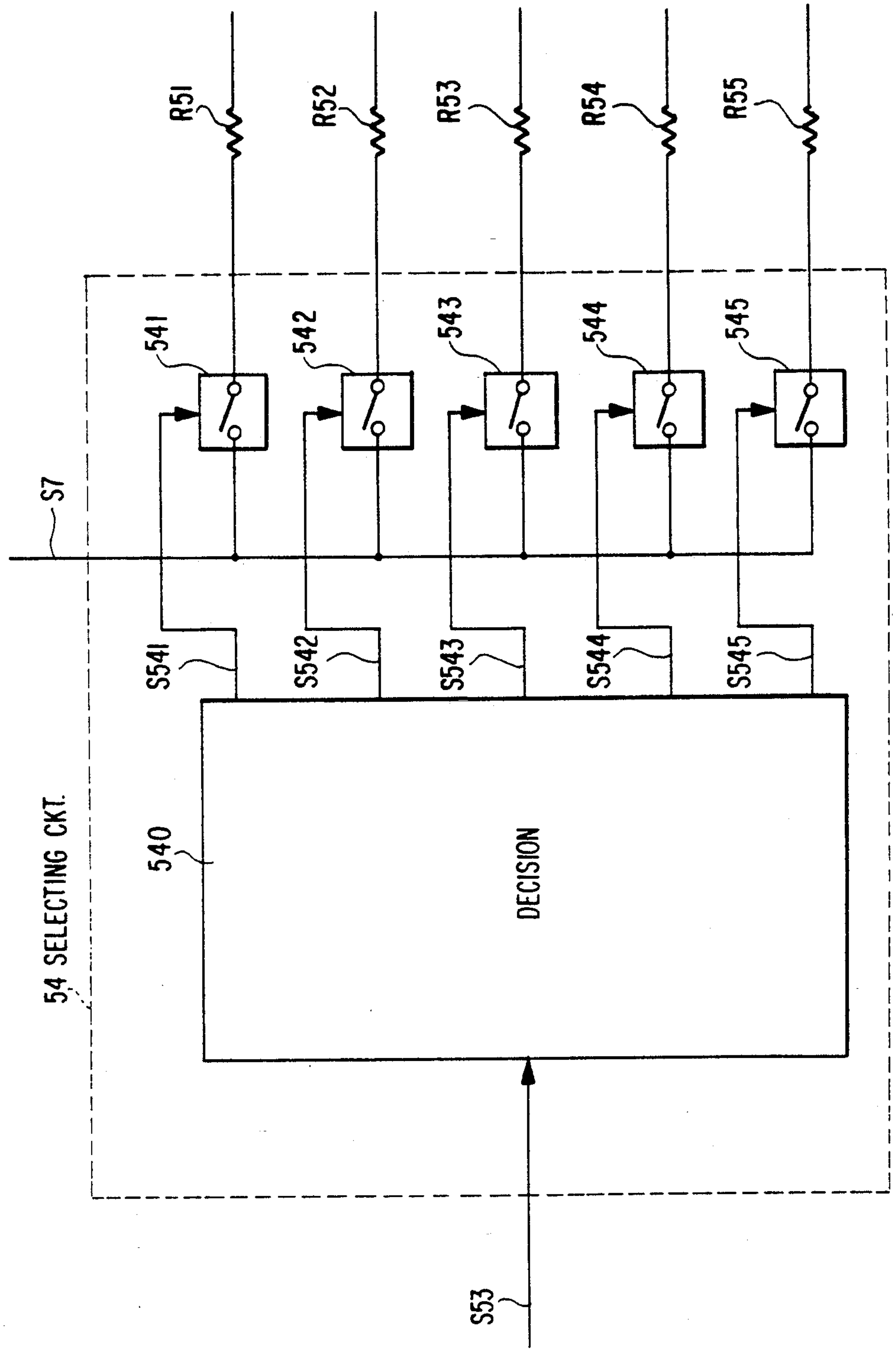
FIG. 5 is a block diagram schematically showing a selecting circuit included in the embodiment.

FIG. 5 shows a specific construction of the selecting circuit 540. As shown, the circuit 540 has a decision 540 which identifies each of a plurality of control signals S53 applied to the input terminals thereof from the control 53 and produces logical high (H) level or low (L) level signals S541–S545 on the output terminals on the basis of the result of previously stated decision. Gates 541–545 are the same in number as the output terminals of the decision 540 and have their input terminals commonly connected to the output terminal of the inverter A51 and have their output terminals connected to the resistors R51–R55, respectively. The gates 541–545 each turns on in response to the H level of the associated logical signal (one of S541–S545).

Figure 6:
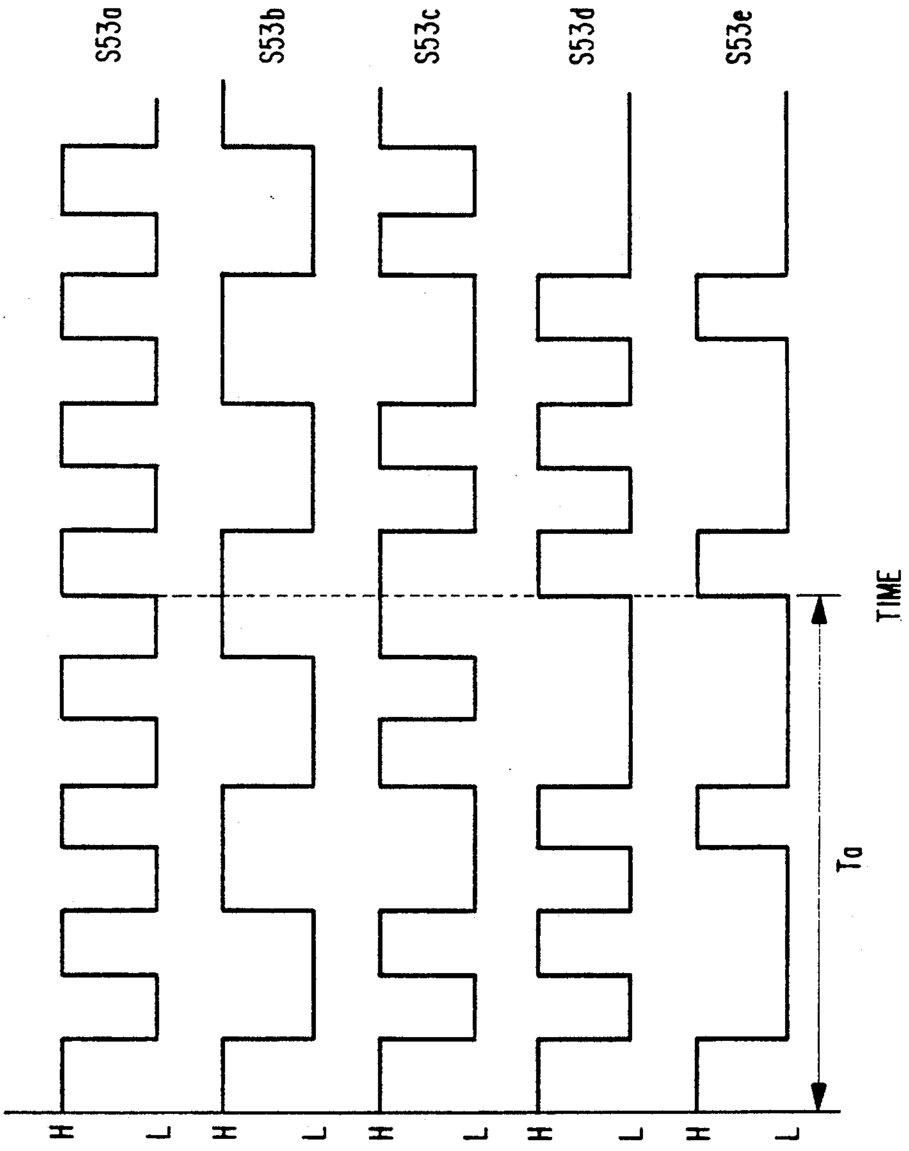
FIG. 6 shows waveforms of selection control signals fed to the selecting circuit.

Referring also to FIG. 6, when the resistors should be sequentially selected, the decision 540 sequentially receives the first to fifth selection control signals S53*a*–S53*e*. When the control 53 is commanded to feed the high-speed clock by the high-speed clock request signal S6, it receives one of the selection control signals S53*a*–S53*e*. Each of the selection control signals S53*a*–S53*e* is a particular combination of H and L levels and has a period of Ta. The number of digital signals repeatin at the period of Ta is eight. The first selection control signal S53*a* sequentially changes the level thereof as "HLHLHLHL" while the second selection control signal S53*b* changes the level as "HLLHHLLH". The first to fifth selection control signals S53*a*–S53*e* correspond one-to-one to the resistors R51–R55. On receiving the first selection control signal S53*a*, the decision 540 changes the logical signal S541 to H level while changing the other logical signals S542–S545 to L level. As a result, only the gate signal 541 is turned on to connect the resistor R51 to the inverter A51. Likewise, on receiving the second selection control signal S53*b*, the decision 540 causes the gate 542 to connect the resistor R52 to the inverter A51. In this manner, the decision 540 turns on one of the gates 541–545 matching the selection control signal S53 to thereby connect associated one of the resistors R51–R55 to the inverter A51. Consequently, the high-speed clock generator generates one of high speed clocks S7*a*–S7*e*.

When no H level control signals S53 are applied to the decision 540 over one period Ta of the low-speed clock S4, the decision 540 changes all the logical signals S541–S545 to L level to thereby disconnect the resistors R51–R55 from the inverter A51. As a result, the high-speed clock generator stops feeding the high-speed clock S7.

Figure 7:
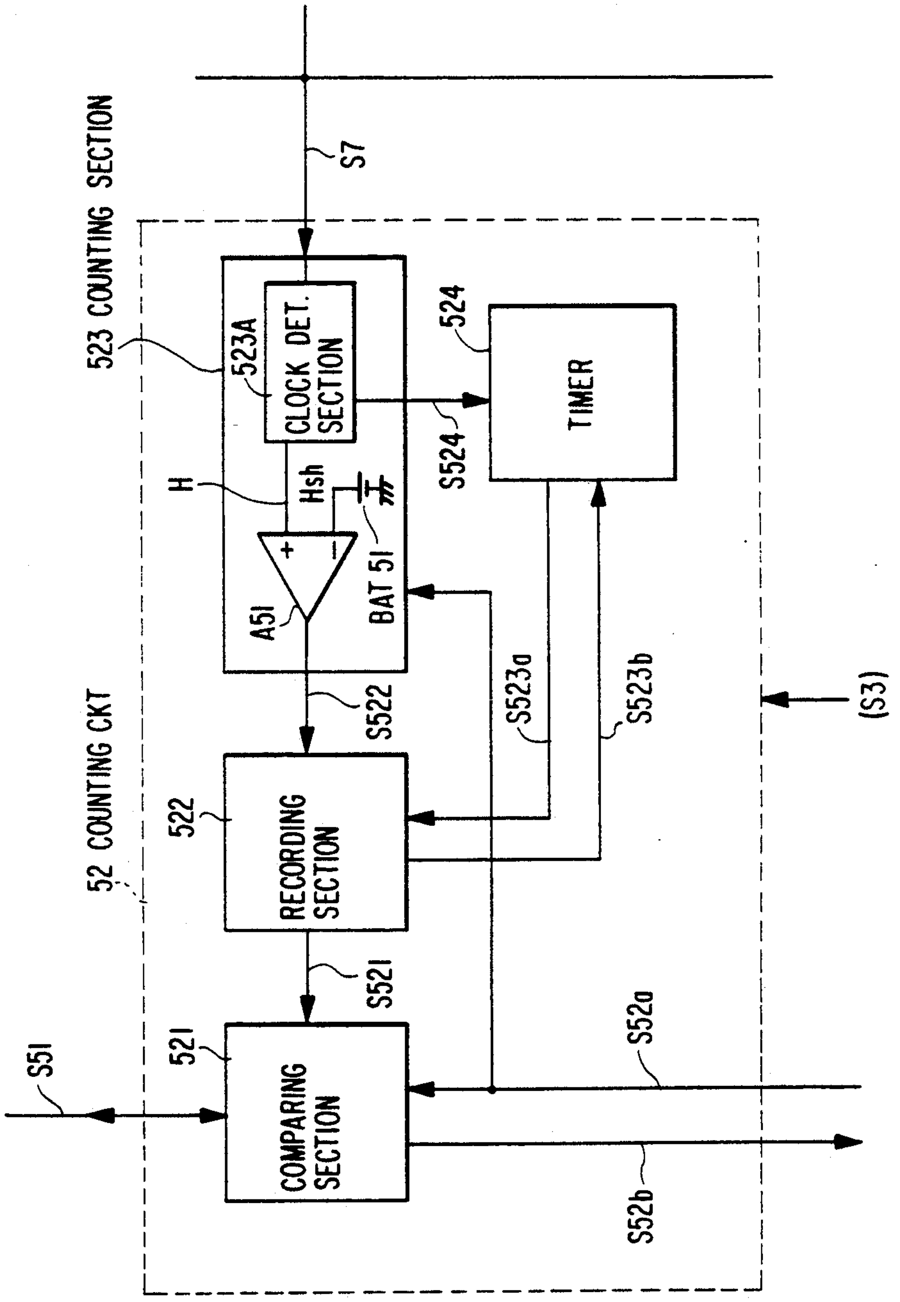
FIG. 7 is a block diagram schematically showing a specific construction of a time counting circuit also included in the embodiment.
Figure 8:
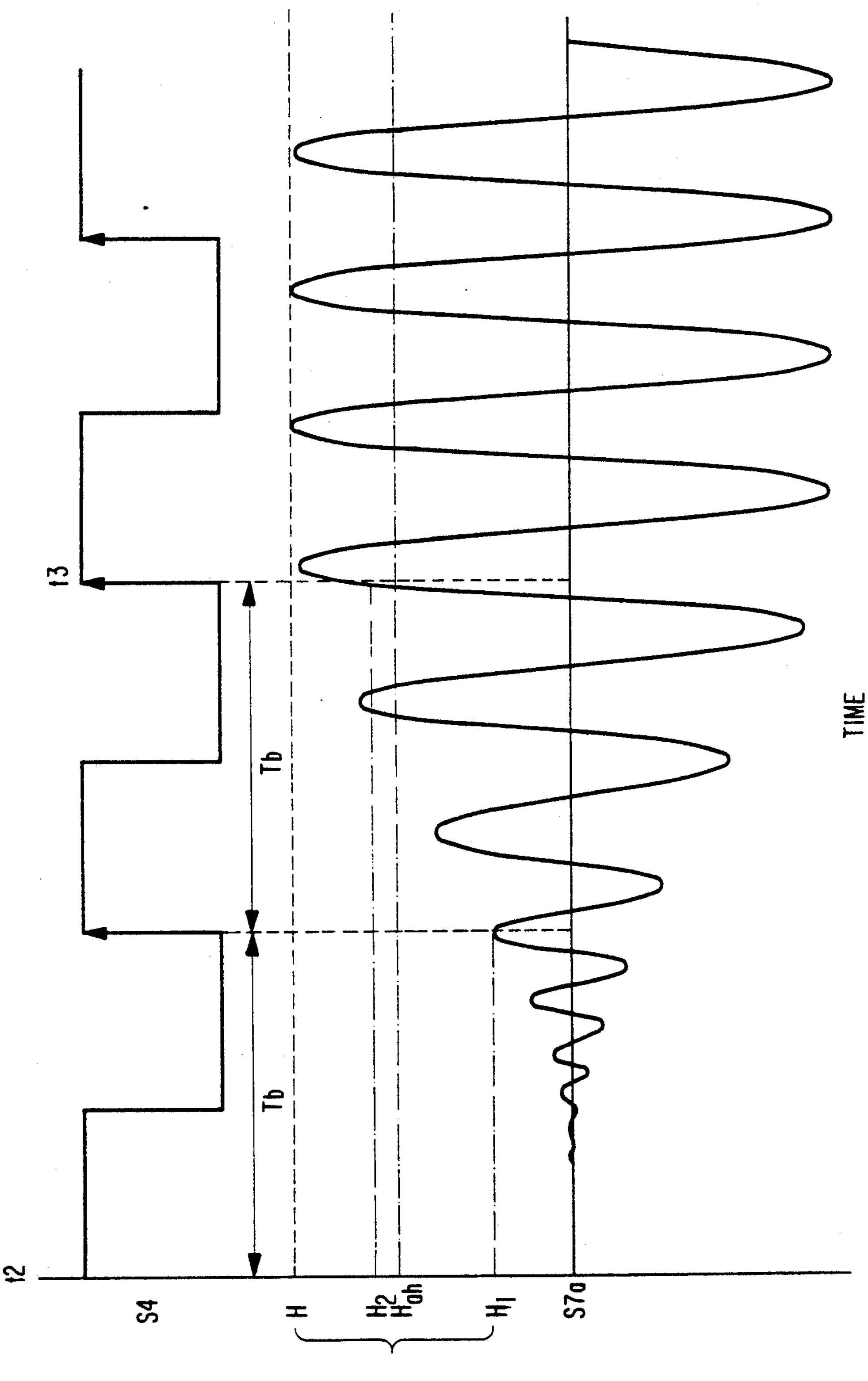
FIG. 8 shows signal waveforms representative of a method of counting the rising time of a high-speed clock practiced by the time counting circuit.
Figure 9:
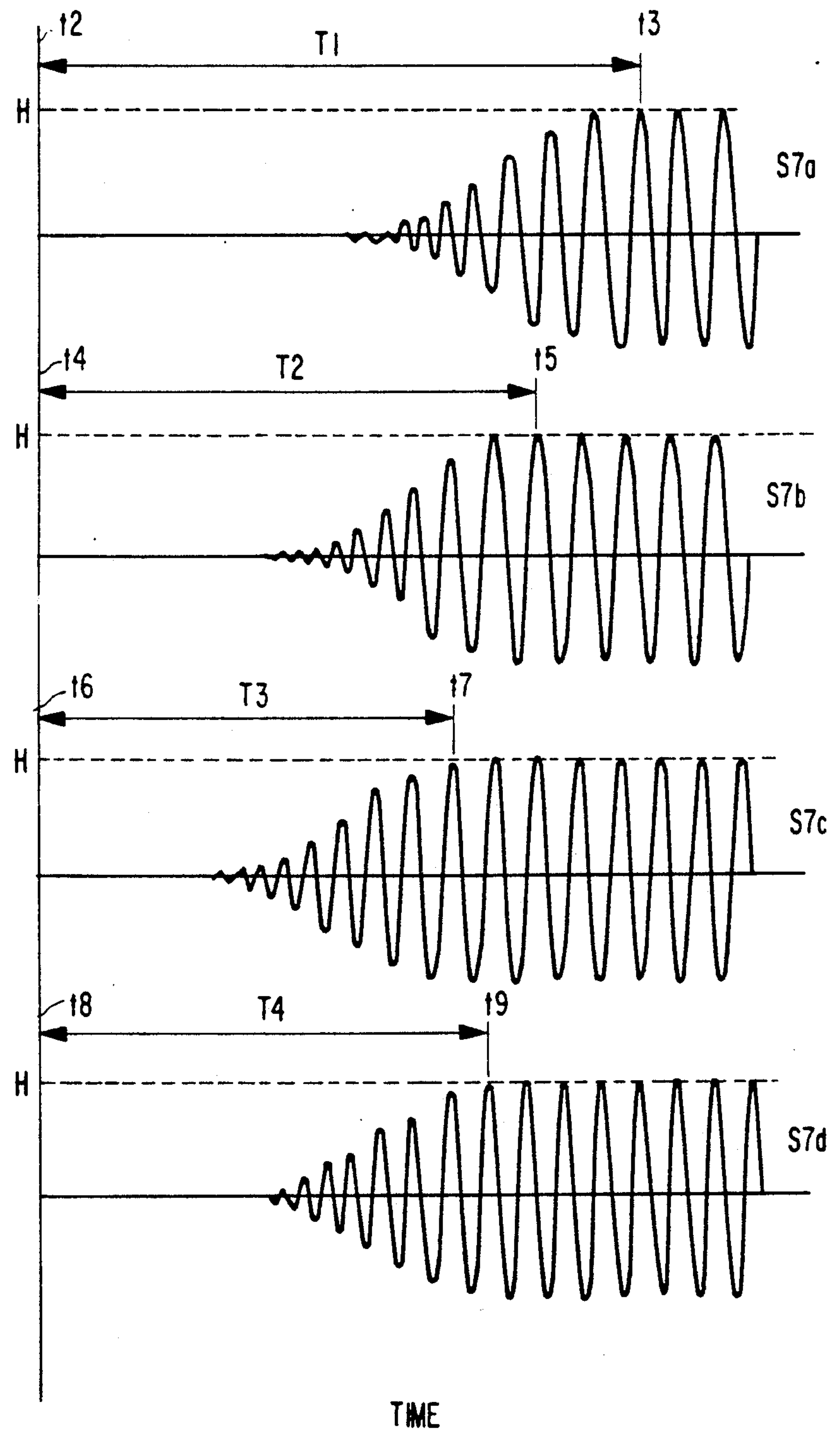
FIG. 9 shows the rising times of the high-speed clock determined by the time counting circuit and each being associated with a particular resistor.

Referring also to FIGS. 7, 8 and 9, the counting circuit 52 includes a counting section 523 and a timer 524. When the counting section 52 receives the control signal S52*a* from the control 53 at the time t2 when the first control signal S53*a* meant for the selecting circuit 54 is generated, it starts the time 524 by a control signal S524. Then, the timer 524 starts sending a time S523*a* to a recording section 523. At this instant, the high-speed clock generator has connected the resistor R51 to the inverter A51, and the high-speed clock S7 (S7*a*) rises, as represented by a waveform in the figures. A clock detecting section 523A included in the counting section 523 detects the amplitude voltage H of the clock S7*a* at each positive-going edge of the low-speed clock (S4) every period Tb of the low-speed clock (30.5 microseconds when the frequency of the low-speed clock is 32.768 kilohertz). Assuming that the low-speed clock S4 rises at the time t2 when the timer 524 starts up, the clock detecting section 523A delivers the amplitude voltage H1 detected on the elapse of the time Tb after the time t2 to a comparator A51 which is also included in the counting section 523. The comparator A51 compares the amplitude voltage H1 with a reference voltage, i.e., a threshold voltage Hsh which is determined by the battery BAT51 beforehand. If the amplitude voltage H1 is higher than the threshold Hsh, the comparator A51 feeds a H level signal to the recording section 522. At this instant, the signal S522 is not fed since the amplitude voltage H1 is lower than the threshold Hsh.

At a time t3 which is tTb (T1) later than the start-up of the timer 524, the clock detecting section 523A detects an amplitude voltage H2 exceeding the threshold Hsh out of the high-speed clock S7*a*. On receiving the amplitude voltage H2, the comparator A51 feeds a H level signal S522 to the recording section 522. In response, the recording section 522 reads the time S523*a* out of the timer 524 and then transfers the rising time T1 of the high-speed clock S7*a* to a comparing section 521 as a counted time S521. At the same time, the recording section 522 resets the timer 524 by a reset signal S523*b*.

On receiving the rising time T1, the comparing section 35 reads the previously mentioned maximum rising time T0 out of the storage 51 and compares it with the time T1. At this stage of operation, the time T1 is, of course, shorter than the time T0. After the comparison, the comparing section 53 writes the shorter time T1 in the storage 51 together with an identification (ID) number (or the resistor number R51 or the number assigned to the first high-speed clock generator) identifying the time T1. Subsequently, the comparing section 521 sends a count end signal S52*a* (e.g. low-speed clock) to the control 53 and ends counting the rising time T1 of the high-speed clock generated by the first high-speed clock generator.

At a time t4, the control 53 informs the counting section 523 of the start of the supply of a second high-speed clock S7*b* by the control signal S52*a*. Then, the counting section 523, timer 524 and recording section 522 count the rising time T2 of the second high-speed clock S7*b*. The comparator 521 reads the rising time T1 out of the storage 51 and compares it with the rising time T2. Since the time T2 is shorter than the time T1, the comparator 521 substitutes the time T2 for the time T1 stored in the storage 51 (as well as the ID number). Then, the comparator 521 sends a set end signal S52*b* to the control 53 and ends counting the time T2. In the same manner, the counting section 523 counts the rising times T3 and T4 of the third and fourth high-speed clocks S7*c* and S7*d* to be generated by the third and fourth clock generators, respectively. Since the rising time T4 is shorter than the rising time T3 the counting circuit 52 (comparing section 521) determines that the rising time T3 of the third high-speed clock S7*c* is shortest. Then, the counting circuit 52 sends to the control 53 a H level control signal S52*b* indicating that the rising times T of the all the high-speed clocks S7 have been counted and a particular resistor has been selected. In response, the control 53 does not send any new control signal S53 while the high-speed clock generating circuit 50 selects the resistor R53 as a resistor to be connected to the high-speed clock generator. If the rising time T5 of the fifth high-speed clock generator is shortest, it is determined to be the shortest rising time.

In summary, a radio pager of the present invention automatically selects, among a plurality of resistors for adjusting the rising time of a high-speed clock generator, a particular resistor which sets up the shortest rising time. This optimally compensates the stability of the high-speed clock generator in respect of the rising characteristic, phase characteristic, etc. Hence, the frequency of the high-speed clock can be sufficiently adjusted to a frequency which eliminates the interference between an RF signal and the high-speed clock which would cause an RF section and control sections to malfunction or to stop operating. Moreover, the radio pager is convenient to operate since the rising time of the high-speed clock can be adjusted not only on a pager production line but also between the mounting of a battery and the beginning of clock supply.

Although the invention has been described with reference to the specific embodiment, this description is not meant to be construed in a limiting sense. Various modifications of the disclosed embodiment, as well as other embodiments of the invention, will become apparent to persons skilled in the art upon reference to the description of the invention. It is, therefore, contemplated that the appended claims will cover any modifications or embodiments as fall within the true scope of the invention.

What is claimed is:

1. A radio pager comprising:

a radio frequency (RF) section for demodulating an RF signal coming in through an antenna to produce a digital paging signal;

a decoding section for decoding said digital paging signal, to produce an address signal;

a ROM for storing an address assigned to said radio pager;

control means for performing selective reception control by comparing said address signal decoded by said decoding section and said address stored in said ROM and for producing an alerting signal when said address signal and said address are coincident;

a battery accommodated in a battery holder disposed in said radio pager for supplying a power source voltage;

a low-speed clock generating circuit for generating a low-speed clock, said low-speed clock being supplied to said decoding section and said control means as an operation clock; and a high-speed clock generating circuit for generating a high-speed clock, said high-speed clock being supplied to said control means as an operation clock instead of said low-speed clock during a predetermined operation, wherein said high-speed clock generating circuit comprises:

a plurality of circuit elements each associated with a rising time of said high-speed clock; and selecting means for selecting one of said plurality of circuit elements which minimizes said rising time.

2. A radio pager as claimed in claim 1, wherein said plurality of circuit elements comprise resistors each having a particular resistance, said selecting means determining said resistor which minimizes said rising time by sequentially selecting said resistors in the order in which the resistance increases.

3. A radio pager as claimed in claim 2, wherein said selecting means comprises:

timer means for counting the rising time of said high-speed clock which is generated every time one of said resistors is selected;

amplitude voltage detecting means for comparing an amplitude voltage of said high-speed clock with a predetermined threshold value and, if said amplitude voltage is higher than said threshold value, generating a detection signal;

recording means for reading, on receiving said detection signal, the time having been counted by said timer means to thereby output the rising time of said high-speed clock; and comparing means for comparing a plurality of times fed thereto from said recording means to determine the shortest rising time and selecting one of said resistors associated with said shortest rising time as said resistor which minimizes said rising time.

4. A radio pager as claimed in claim 3, wherein said selecting means starts up immediately after the mounting of said battery and ends the operation for selecting said resistor before said predetermined operation which needs said high-speed clock begins.

5. A radio pager as claimed in claim 4, further comprising means for connecting said selected resistor to said high-speed generating circuit when said high-speed clock generating circuit starts on said predetermined operation.

6. A radio pager as claimed in claim 1, wherein said high-speed clock generating circuit comprises frequency adjusting means for finely adjusting the frequency of said high-speed clock, the operation for selecting said circuit element being performed after the fine adjustment of said frequency.

7. A radio pager as claimed in claim 1, wherein said selecting means starts up on receiving said low-speed clock and ends the operation for selecting said circuit element before said predetermined operation which needs said high-speed clock.

8. A radio pager as claimed in claim 7, further comprising means for connecting said selected resistor to said high-speed clock generating circuit when said high-speed clock generating circuit starts on said predetermined operation.

9. A radio pager comprising:

an RF section for demodulating an RF signal coming in through an antenna to produce a digital paging signal;

a decoding section for generating an address signal in response to said digital paging signal;

a ROM for storing an address assigned to said radio pager;

selective reception control means for comparing said address signal decoded by said decoding section and said address stored in said ROM and for delivering an alerting signal if said address signal and said address are coincident;

a battery accommodated in a battery holder disposed in said radio pager for supplying a primary voltage;

a low-speed clock generating circuit for generating a low-speed clock, said low speed clock being used in said decoding section and said selective reception control means; and a high-speed clock generating circuit for generating a high-speed clock, said high-speed clock being used in said selective reception control means instead of said low-speed clock during a rapid processing mode, wherein said high-speed clock generating circuit comprises:

a plurality of resistors;

selecting means comprising means for sequentially selecting said resistors one by one in response to a control signal, and means for selecting, on receiving an identification signal identifying one of said resistors, said one resistor;

a high-speed clock generator constituted by a ring-like connection of an inverter, a crystal oscillator and said selected resistor for generating said high-speed clock, a capacitor being connected in parallel with said crystal oscillator;

timer means for counting the rising time of said high-speed clock by receiving said control signal every time one of said resistors is connected to said high-speed clock generator;

amplitude voltage detecting means for comparing the amplitude voltage of said high-speed clock with a predetermined threshold value and, if said amplitude voltage is higher than said threshold value, generating a detection signal;

recording means for reading, on receiving said detection signal, the time having been counted by said timer means to thereby produce the rising time of said high-speed clock;

comparing means for comparing a plurality of times fed thereto from said recording means to determine the shortest one of said rising times, and storing one of said resistors associated with said shortest rising time and said identification signal representative of said one resistor;

means for generating said control signal in response to a resistor selection start signal fed thereto from said selective reception control means; and means responsive to a high-speed clock request signal from said selective reception control means for reading said identification signal out of said comparing means and sending said identification signal to said selecting means.

10. A radio pager as claimed in claim 9, wherein the selection of said resistor by said selecting means occurs after the frequency of said high-speed clock has been adjusted by the adjustment of the capacitance of said capacitor.

11. A radio pager as claimed in claim 10, wherein said resistor selection start signal is fed on the generation of said low-speed clock which occurs when said battery is mounted.

12. A radio pager comprising:

an RF section for demodulating an RF signal coming in through an antenna to produce a digital paging signal;

a decoding section comprising a decoder for generating an address signal in response to said digital paging signal;

a ROM for storing an address assigned to said radio pager;

reception control means for performing selective reception control by comparing said address signal decoded in said decoding section and said address stored in said ROM and, if said address signal and said address are coincident, outputting an alerting signal;

a battery accommodated in a battery holder housed in said radio pager for supplying a primary voltage;

a low-speed clock generating circuit for producing a low-speed clock, said low speed clock being supplied to said decoding section and to said reception control means as an operation clock; and a high-speed clock generating circuit for producing a high-speed clock, said high-speed clock being supplied to said reception control means as an operation clock instead of said low-speed clock during a predetermined operation period, wherein said high-speed clock producing circuit comprises:

a plurality of resistors;

selecting means for selecting one of said plurality of resistors in response to each of a plurality of selection control signals;

a high-speed clock generator for generating said high-speed clock by connecting an inverter, a crystal oscillator and selected one of said resistors in a ring-like configuration;

a capacitor connected in parallel with said crystal oscillator for constituting an element for adjusting the frequency of said high-speed clock;

a storage means for storing the rising time of said high-speed clock together with an identification signal identifying one of said resistors associated with said rising time;

a time counting means for counting the rising time of said high-speed clock every time one of said selection control signals is applied to said selecting means;

comparing means comprising means for storing the shortest one of a plurality of rising times counted by said time counting means in said storage means together with said identification signal, and means for sending a count end signal when said comparing means completes the storage; and control means comprising means for sequentially sending said plurality of selection control signals one by one in response to a selection start signal from said reception control means, means for reading said identification signal out of said storage means in response to a high-speed clock request signal from said reception control means, and means for sending a selection control signal matching said identification signal to said selecting means.

13. A radio pager as claimed in claim 12, wherein said time counting means comprises:

timer means for starting counting time when connected to said high-speed clock generator;

detecting means for detecting the amplitude voltage of said high-speed clock; and recording means for comparing said amplitude voltage with a predetermined threshold value and, if said amplitude voltage is higher than said threshold value, reading the time having been counted by said timer means as a rising time.

14. A radio pager as claimed in claim 12, wherein said comparing means comprises:

means for comparing a rising time received from said recording means and a rising time stored in said storage;

rewriting means for substituting shorter one of said two rising times for said rising time stored in said storage; and means for sending said count end signal to said control means if said rising time stored in said storage is longer than said rising time received from said recording means.

15. A radio pager as claimed in claim 12, wherein said plurality of resistors are commonly connected at one end thereof;

said selecting means comprising:

deciding means for identifying each of said plurality of selection control signals and turning one of output terminals associated with said identified selection control signal to a high level; and gates having input terminals thereof commonly connected to the output terminal of said inverter, having output terminals thereof connected one-to-one to the other ends of said resistors, and having control terminals thereof connected one-to-one to said output terminals of said deciding means.

* * * * *

UNITED STATES PATENT AND TRADEMARK OFFICE

CERTIFICATE OF CORRECTION

PATENT NO. : 5,283,568
DATED : Feb. 1, 1994
INVENTOR(S) : Takayuki ASAI et al.

It is certified that error(s) appears in the above-identified patent and that said Letters Patent is hereby corrected as shown below:

Col. 3, line 7, delete "beer" and insert --been--;

Col. 4, line 25, after "5", insert --A--.

Col. 7, line 2, delete "cock" and insert --clock--.

Col. 7, line 29, delete "repeatin" and insert --repeated--.

Col. 7, line 61, delete "time" and insert --timer--.

Signed and Sealed this

Fourteenth Day of February, 1995

Attest:

BRUCE LEHMAN

*Attesting Officer* *Commissioner of Patents and Trademarks*